United States Patent
Okochi et al.

(10) Patent No.: US 6,916,119 B2
(45) Date of Patent: Jul. 12, 2005

(54) OPTICAL FIBER CONNECTOR AND OPTICAL COMMUNICATION MODULE USING THE SAME

(75) Inventors: Ken Okochi, Miyagi-ken (JP); Kimihiro Kikuchi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 518 days.

(21) Appl. No.: 09/791,293

(22) Filed: Feb. 23, 2001

(65) Prior Publication Data

US 2001/0019647 A1 Sep. 6, 2001

(30) Foreign Application Priority Data

Feb. 28, 2000 (JP) ........................................ 2000-055978

(51) Int. Cl.[7] .............................................. G02B 6/36
(52) U.S. Cl. ......................... 385/78; 385/136; 385/137
(58) Field of Search ............................. 385/78, 88, 89, 385/90–94

(56) References Cited

U.S. PATENT DOCUMENTS

| | | | |
|---|---|---|---|
| 5,042,891 A | * 8/1991 | Mulholland et al. | 385/93 |
| 5,274,723 A | * 12/1993 | Komatsu | 385/92 |
| 5,307,435 A | * 4/1994 | Chihara | 385/92 |
| 5,317,663 A | * 5/1994 | Beard et al. | 385/70 |
| 5,333,224 A | 7/1994 | Kikuchi | |
| 5,533,159 A | * 7/1996 | Okochi et al. | 385/93 |
| 5,546,490 A | * 8/1996 | Kikuchi et al. | 385/93 |
| 5,737,465 A | * 4/1998 | Okochi | 385/88 |

* cited by examiner

*Primary Examiner*—John D. Lee
*Assistant Examiner*—Jennifer Doan
(74) *Attorney, Agent, or Firm*—Brinks Hofer Gilson & Lione

(57) ABSTRACT

An optical fiber connector includes a receptacle casing, a cylinder provided in the receptacle casing, and a wire spring disposed on the inner wall of the cylinder. In the optical fiber connector, a fiber holding part provided at an end of an optical fiber is inserted into the cylinder, the outer periphery of the fiber holding part is elastically pressed by the wire spring in the direction perpendicular to an optical axis of the optical fiber, the outer periphery of the fiber holding part is brought into abutment with the inner wall of the cylinder, and the end of the optical fiber is fitted to the receptacle casing.

28 Claims, 11 Drawing Sheets

OPTICAL FIBER CONNECTOR AND OPTICAL COMMUNICATION MODULE USING THE SAME

BACKGROUND OF THE INVENTION

1. Field of the Invention

The present invention relates to an optical fiber connector for optically connecting an optical fiber and an optical element or an optical fiber, and to an optical communication module using the same.

2. Description of the Related Art

In general, optical communication modules have a combined constitution of optical elements, such as a laser diode and a lens, and an optical fiber connector for connecting optical fibers, and laser beams emitted from the laser diode are focused by the lens so as to be optically coupled in the optical fibers.

Optical fiber connectors in which the optical fibers are detachable to a body of the module are referred to as being of the receptacle type.

The optical fiber connectors include an optical fiber connector of the type connecting optical fibers using screws, and an optical fiber connector of the type connecting optical fibers using elastic fittings.

As shown in FIG. 15, a conventional optical fiber connector 150 includes a housing 151 made of stainless steel. The housing 151 is composed of a plate-like base 151a having a small circular hole 151 formed in the center thereof, and a cylindrical outer peripheral part 151b integrally formed on the base 151a.

A resin clamper 153 reinforced by glass fiber is composed of a base part 153a, a pair of legs 153c integrally erected on the base part 153a, each having an elastic pawl 153b at an end thereof, and a cylindrical part 153d integrally formed erected on the base part 153a at a position between the legs 153c. The base part 153a is formed with a circular hole 153c having the same size as the circular hole 151c formed in the base 151a. The clamper 153 is accommodated in the housing 151 in such a manner as to superpose the circular hole 151c of the housing 151 and the circular hole 153c of the clamper 153.

A sleeve 155 is composed of a thin-wall long cylindrical part 155a, and a flange 155b integrally formed with a base end of the long cylindrical part 155a. A circular opening 155c is formed at an end of the long cylindrical part 155a, and the inner diameter thereof is accurately formed by cutting from the circular opening 155c to a bottom part 155d of the inner wall of the long cylindrical part 155a.

The bottom part 155d is formed with an aperture 155e opened through the lower surface of the flange 155b to pass incident or emitted light therethrough. A surface of the bottom part 155d is an abutting surface against which an end surface of an optical fiber (described later) abuts.

The outer periphery of the long cylindrical part 155a is placed in the cylindrical part 153d of the clamper 153 and in the circular hole 151c of the base 151a, and the upper surface of the flange 155b abuts against the lower surface of the base 151a.

An optical member 160 is composed of an optical element 162, such as a semiconductor laser, a lens 163, and the like. A holder 161 holding therein the optical member 160 is formed in a cylindrical shape, the lens 163 is disposed in the center thereof, the optical element 162 is disposed on one end thereof, and an aperture 161a is formed in the other end for emitting light from the optical element 162 through the lens 163.

The upper surface of the holder 161 having the aperture 161a formed therein is abutted against the lower surface of the flange 155 and is fixed by welding.

As shown in FIG. 14, a plug 101 comprises a plug body 101a, a cylindrical ferrule-holding member 102 accommodated in the plug body 101a, and a ceramic ferrule 103 held in the ferrule-holding member 102.

The ferrule-holding member 102 has a groove-like elastic lock-receiving part 102a formed on an outer peripheral wall thereof, and a circular hole 102b formed in an end thereof for receiving the cylindrical part 153d of the clamper 153 and the sleeve 155 when the plug 101 is fitted to the optical fiber connector 150.

The ferrule 103 contains an optical fiber 100 in advance, and an end surface thereof is polished together with an end surface of the optical fiber 100 so as to be formed in a predetermined shape, and it is mirror-finished.

The ferrule 103 is elastically urged by a coil spring 104 in the plug body 101a in a direction in which an end thereof protrudes outward (leftward in FIG. 14) so as to lock a part of the outer peripheral wall thereof to the inner wall of the ferrule-holding member 102 so that the end of the ferrule 103 is located in the sleeve 155, and is slightly protruding from the end surface of the plug body 101a.

A method for fitting the plug 101 to the thus-constructed optical fiber 150 will now be described.

First, as shown in FIG. 15, the end of the plug 101 is located to face the opening end of the housing 151 of the optical fiber connector 150.

When the end of the plug 101 is inserted into the opening end of the housing 151, the pair of legs 153c of the clamper 153 abut against the end of the plug 101 and expand, the plug body 101a moves into the housing 151, the outer periphery of the ferrule-holding member 102 moves between the legs 153c, the ferrule 103 moves into the long cylindrical part 155a of the sleeve 155, an end surface of the ferrule 103 is elastically brought into contact with the bottom part (abutting surface) 155d of the sleeve 155, and the pair of elastic pawls 153b of the clamper 153 is snap-fitted into the elastic lock-receiving part 102a.

As described above, the plug 101 is not easily disconnected from the optical fiber connector 150 by removing operation of the plug 101 because the ferrule 103 is attached in the cylinder of the sleeve 155, and the direction of deformation of the legs 153c is different from the direction of insertion of the plug 101 and the direction of deformation of the elastic pawls 153b.

Another conventional optical fiber connector (not shown) has been known in which a ferrule is positioned and held by a split sleeve having a screw slot formed by bending a metal plate in a cylindrical shape. A surface of the split sleeve on the opposite side of the screw slot is welded and fixed to the optical fiber connector, whereby the split sleeve is integrally assembled with the optical fiber connector.

In the above-described conventional optical fiber connector 150, since the ferrule 103 of the plug 101 is held in the cylinder of the sleeve 155 of the optical fiber 150 so as to be inserted therein and extracted therefrom, a space is formed between the inner wall of the sleeve 155 and the outer periphery of the ferrule 103. For this reason, since the ferrule 103 moves in the space in the direction perpendicular to an optical axis, the space should be minimized in order to restrict variations in optical coupling due to the insertion and the extraction of the ferrule 103, and a high accuracy is required for forming the inner diameter of the sleeve 155 by cutting.

In another conventional optical fiber connector in which the ferrule is held by the split sleeve, a wide range of welding and fixing conditions for the split sleeve should be ensured in order for the split sleeve to be able to withstand the insertion and extraction of the ferrule. On the other hand, if the range of welding and fixing the split sleeve is broadened, a portion of the split sleeve serving as a spring for holding the ferrule is limited. Therefore, in a ferrule having a small outer diameter, the holding force varies, and the split sleeve becomes difficult to open, so that the ferrule cannot be smoothly inserted in and extracted from the sleeve.

SUMMARY OF THE INVENTION

Accordingly, objects of the present invention are to provide an optical fiber connector in which the variations in optical coupling are restricted with a simple structure, and to provide an optical communication module using the same.

It is another object to provide an optical fiber connector which can respond to a reduction in diameter of a ferrule and securely hold the ferrule, and an optical communication module using the same.

In order to achieve at least one of the above-described objects, according to an aspect of the invention, there is provided an optical fiber connector including a receptacle casing, a cylinder provided in the receptacle casing, and an elastic member disposed on the inner wall of the cylinder, wherein a fiber holding part provided at an end of an optical fiber is inserted into the cylinder, the outer periphery of the fiber holding part is elastically pressed by the elastic member in the direction perpendicular to an optical axis of the optical fiber, the outer periphery of the fiber holding part is brought into abutment with the inner wall of the cylinder, and the end of the optical fiber is fitted to the receptacle casing.

With the arrangements, even if a gap is formed between the inner wall of the cylinder and the fiber holding part when the fiber holding part is inserted into the cylinder, the outer periphery of the fiber holding part is elastically pressed in the radial direction by the elastic member disposed in the cylinder and is brought into abutment with predetermined sections on the inner wall, so that the optical fiber in the fiber holding part can be securely fitted to the cylinder. For this reason, variations in optical coupling effected by the optical fiber in the optical fiber connector can be restricted with a simple structure, and a small-diameter ferrule can be securely fitted.

Preferably, the inner wall of the cylinder is formed with a recess for accommodating and positioning the elastic member, and a part of the elastic member is protruded from the inner wall of the cylinder. With the arrangements, the elastic member disposed in the recess of the cylinder elastically presses the outer periphery of the fiber holding part in the radial direction due to the elastic urging force thereof, and brings the outer periphery into abutment with the predetermined sections on the inner wall when the fiber holding part is inserted into the inner wall of the cylinder. Therefore, the elastic member can be securely locked in the cylinder.

In addition, the fiber holding part, and the optical fiber contained in the fiber holding part are constantly pressed in the radial direction when the fiber holding part is repeatedly inserted into and pulled out from the cylinder. Therefore, variations in the holding force can be restricted.

Preferably, a part of the elastic member locks in the recess of the cylinder, whereby rotation of the cylinder in the circumferential direction is prevented. With this arrangement, the elastic member can be easily fixed without loss of the elastic holding force. In addition, pressed sections of the fiber holding part and the optical fiber contained in the fiber holding part are always fixed when the fiber holding part is inserted in and pulled out from the cylinder, and the optical fiber connector can be assembled accurately with reference to the pressed surfaces.

Preferably, the elastic member is formed of a spring wire rod, the spring wire rod is bent, and the spring wire rod is locked by an elastic urging force thereof in the recess of the cylinder. With the arrangements, the outer periphery of the fiber holding part inserted into the cylinder can be securely held with a simple structure.

Preferably, the spring wire rod is shaped like a ring, and both ends of the spring wire rod are elastically pressed against the recess of the cylinder. With the arrangements, since the spring wire rod is engaged with the recess of the cylinder by its own resilience, the wire spring is not easily disengaged even if an unnecessary external force is applied thereto.

Preferably, the cylinder includes an outer cylinder and an inner cylinder, a plurality of the inner cylinders are accommodated in the outer cylinder in the direction of the optical axis of the optical fiber at predetermined intervals, the intervals between the inner cylinders constitute the recess of the cylinder, and the inner walls of the inner cylinders constitute the inner wall of the cylinder. With the arrangements, the cylinder can be easily assembled by inserting two divided inner cylinders into the outer cylinder.

According to another aspect of the present invention, there is provided an optical communication module, wherein an optical member for emitting or receiving light is fixed to the outside of a receptacle casing of an optical fiber connector so that an optical axis of the optical fiber fitted to the receptacle casing coincides with an optical axis of the optical member.

With the arrangements, the optical member and the optical fiber connector can be easily positioned and fixed, and a total connection loss of optical coupling can be substantially restricted.

Further objects, features, and advantages of the present invention will be apparent from the following description of the preferred embodiments with reference to the attached drawings.

DESCRIPTION OF THE PREFERRED EMBODIMENTS

Figure 1:
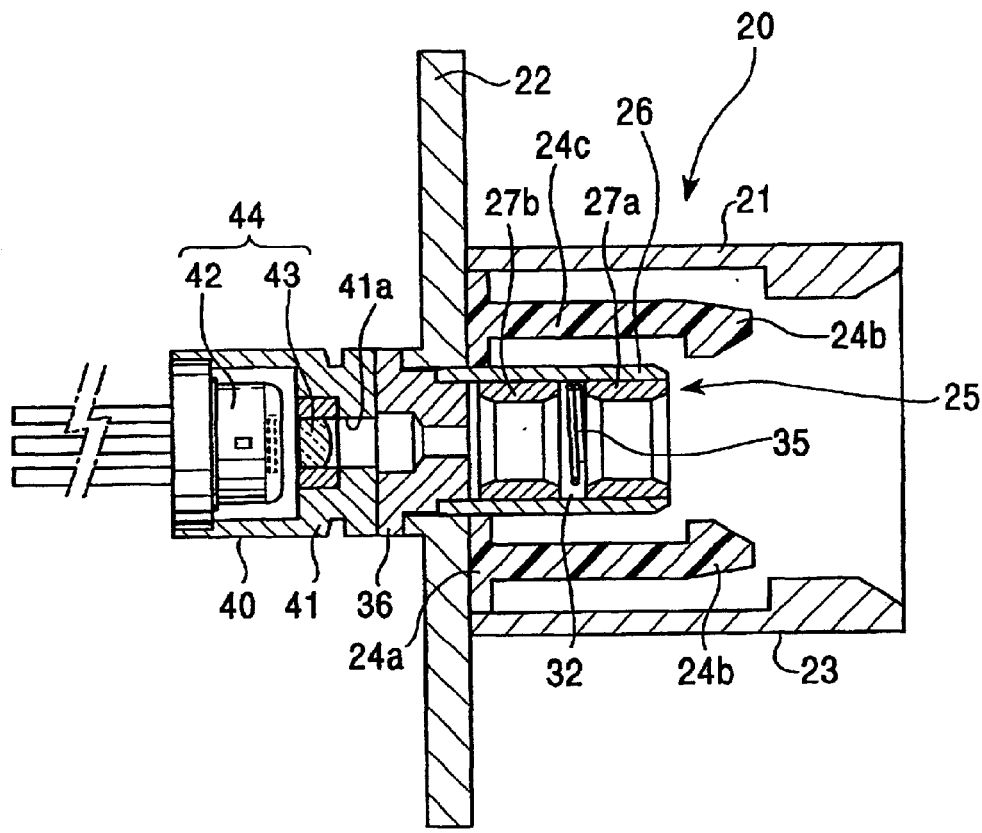
FIG. 1 is a sectional view showing an optical fiber connector according to a first embodiment of the present invention.

An optical fiber connector 20 according to a first embodiment of the present invention will now be described with reference to the attached drawings.

The construction and function of a plug having a ferrule in which an end of an optical fiber is contained are the same as the above-described plug 101, and the plug is indicated by the same reference numeral to omit the description thereof.

Figure 3:
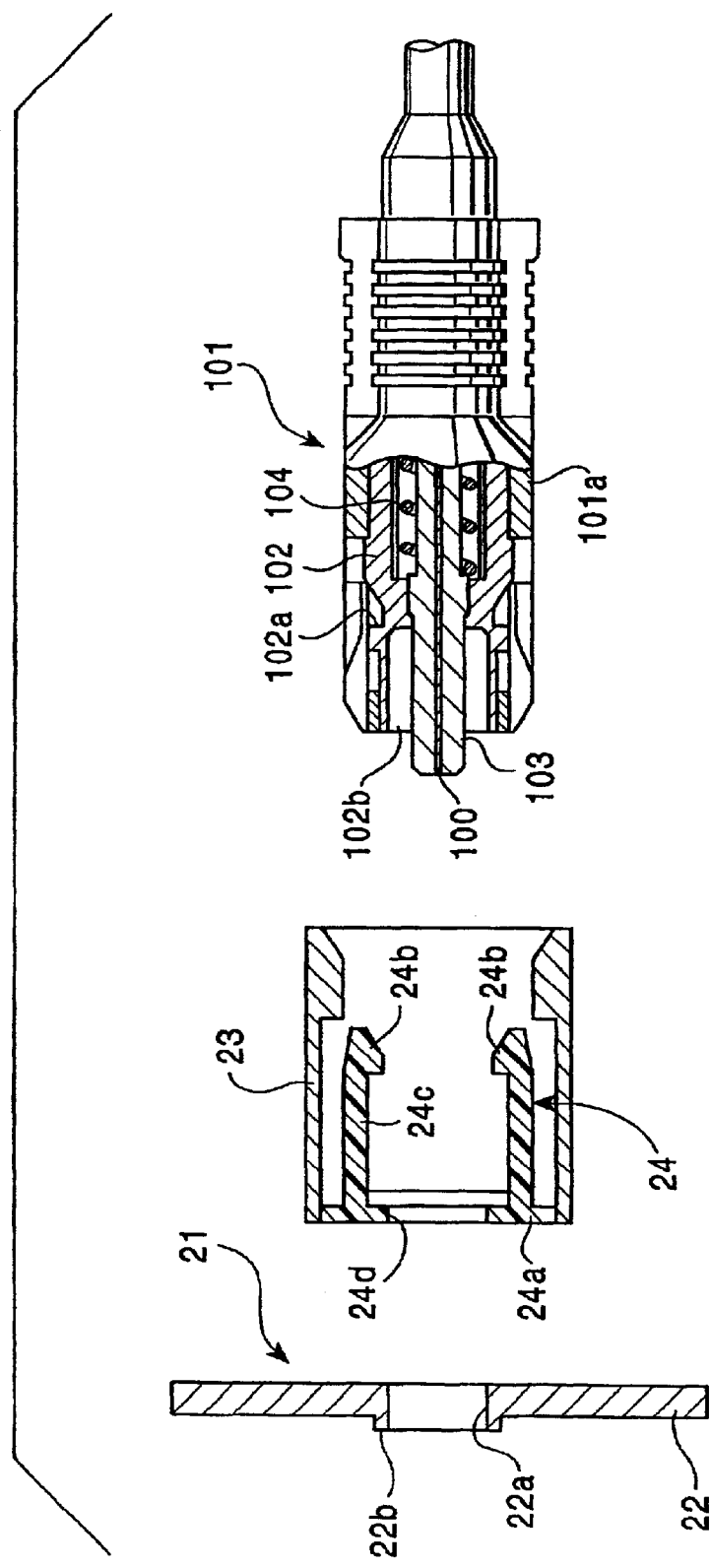
FIG. 3 is an enlarged exploded view showing a principal part of the optical fiber connector according to the first embodiment of the present invention.

As shown in FIGS. 1 and 3, a receptacle casing 21 of the optical fiber connector 20 is composed of a base 22 made of stainless steel that is shaped like a rectangular flat plate, a cylindrical outer peripheral part 23 made of stainless steel that is mounted on the base 22, and a resin clamper 24 reinforced by a cylindrical glass fiber that is disposed in the receptacle casing 21.

A circular hole 22a is formed in approximately the center of the base 22. The periphery of the circular hole 22a forms a protruded edge 22b slightly protruding outward.

The clamper 24 is composed of a plate-like base part 24a, and a pair of legs 24c integrally formed erected on the base part 24a, each having an elastic pawl 24b at an end thereof.

A circular hole 24d is formed in approximately the center of the base part 24a, and the size of the circular hole 24d is the same as that of the circular hole 22a of the base 22. The base part 24a of the clamper 24 is disposed on the base 22 with the circular hole 24d of the base part 24a and the circular hole 22a of the base 22 superposed, and the outer peripheral edge of the base part 24a is fitted in the outer peripheral part 23 of the receptacle casing 21.

Figure 2:
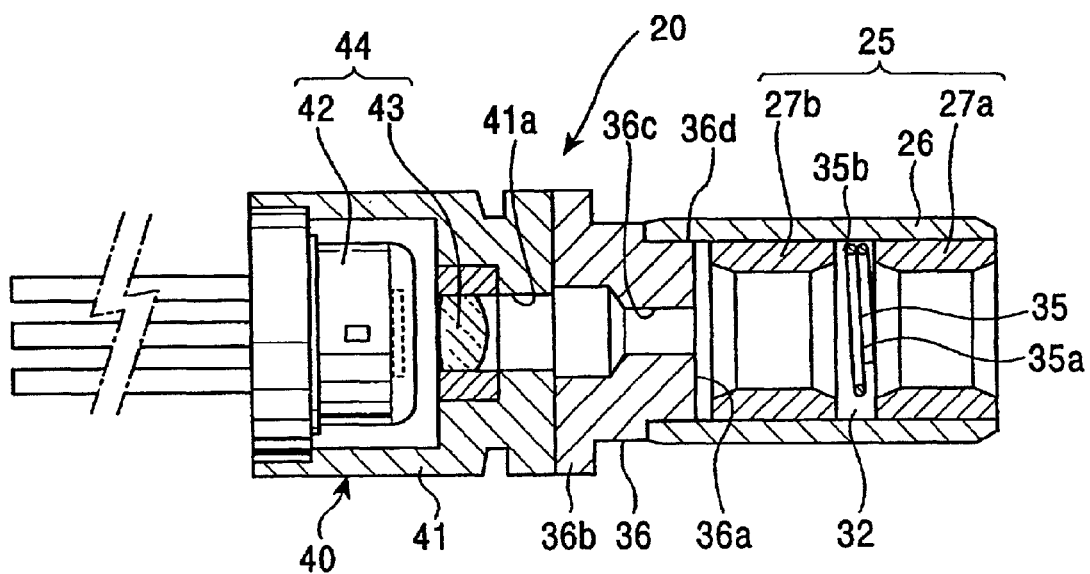
FIG. 2 is a enlarged sectional view showing a principal part of the optical fiber connector according to the first embodiment of the present invention.
Figure 5A:
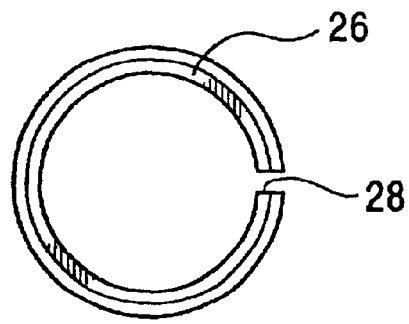
FIG. 5A shows an outer cylinder of the optical fiber connector according to the first embodiment of the present invention.
Figure 5B:
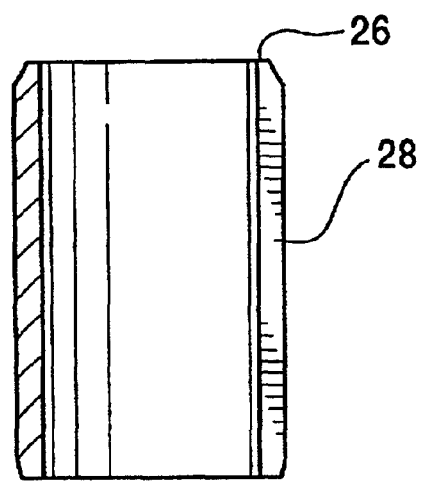
FIG. 5B is a vertical sectional view of FIG. 5A.

As shown in FIGS. 2, 5A, and 5B, a cylinder 25 is composed of one outer cylinder 26 and two inner cylinders 27a and 27b.

The outer cylinder 26 is made of stainless steel having an elastic urging force, and a slit 28 is formed in the outer periphery thereof along the central axis thereof so that the outer cylinder 26 is elastically deformed in the radial direction thereof.

Figure 6:
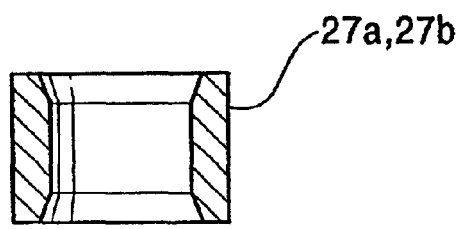
FIG. 6 is a vertical sectional view showing an inner cylinder of the optical fiber connector according to the first embodiment of the present invention.

As shown in FIGS. 2 and 6, the inner cylinders 27a and 27b are formed of a sintered metal, such as stainless steel, which is hard and has a slightly thick-wall cylindrical shape.

Figure 7A:
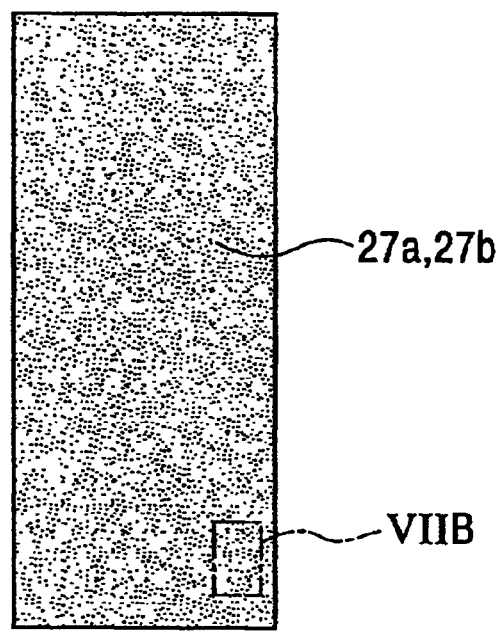
FIGS. 7A and 7B are illustrations each schematically showing the state of an inner wall surface of the inner cylinder in FIG. 6.
Figure 7B:
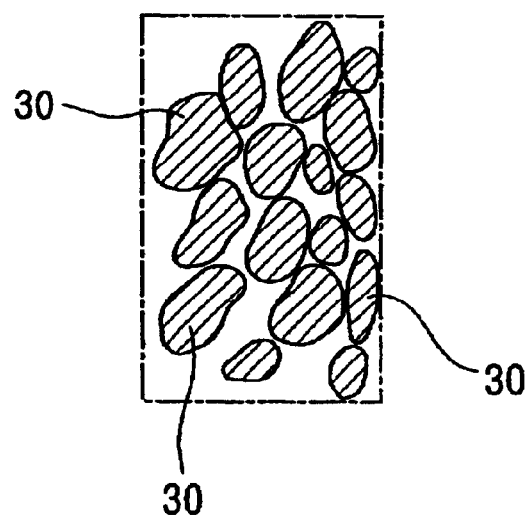

As shown in FIG. 7, the inner cylinders 27a and 27b have a large number of micropores 30 formed in the surfaces thereof. The inner walls of the inner cylinders 27a and 27b have smooth surfaces, a large number of micropores 30 is formed in the surfaces, and one end of the inner wall of each of the inner cylinders is formed more accurately.

These micropores 30 are formed while the characteristics thereof, such as size, are controlled by burning time. The volume of the sintered metal used for the inner cylinders 27a and 27b and contained air are in a ratio of 70% and 30%.

Each of the inner cylinders 27a and 27b may have a structure in which the micropores are formed in the surfaces thereof. The material of the inner cylinders 27a and 27b is not limited to the sintered metal, such as stainless steel. A sintered ceramic, such as zirconia, may be used instead.

The inner cylinders 27a and 27b are accommodated in the outer cylinder 26, and are disposed in the axial direction at a predetermined interval, as shown in FIG. 1. A recessed space 32 is formed between the inner cylinders 27a and 27b in the inner wall of the outer cylinder 26.

Figure 8A:
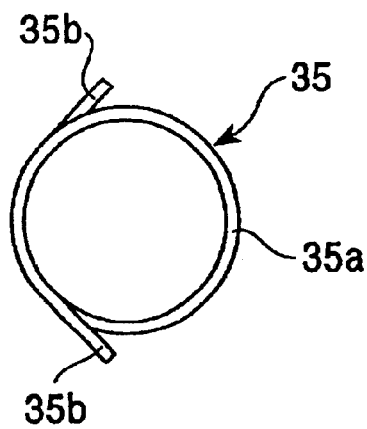
FIG. 8A is a plan view showing an elastic member of the optical fiber connector according to the first embodiment of the present invention.

As shown in FIG. 8A, a wire spring 35 serving as an elastic member is formed of at least a one turn ring-shaped wire rod, and is composed of a ring part 35a having an inner diameter larger than that of the ferrule 103, and ends 35b protruding outward from the ring part 35a.

The ends 35b are engaged with the recessed space 32 of the cylinder 25, and the ring part 35a is disposed in a radial space in the cylinder 25.

Figure 4:
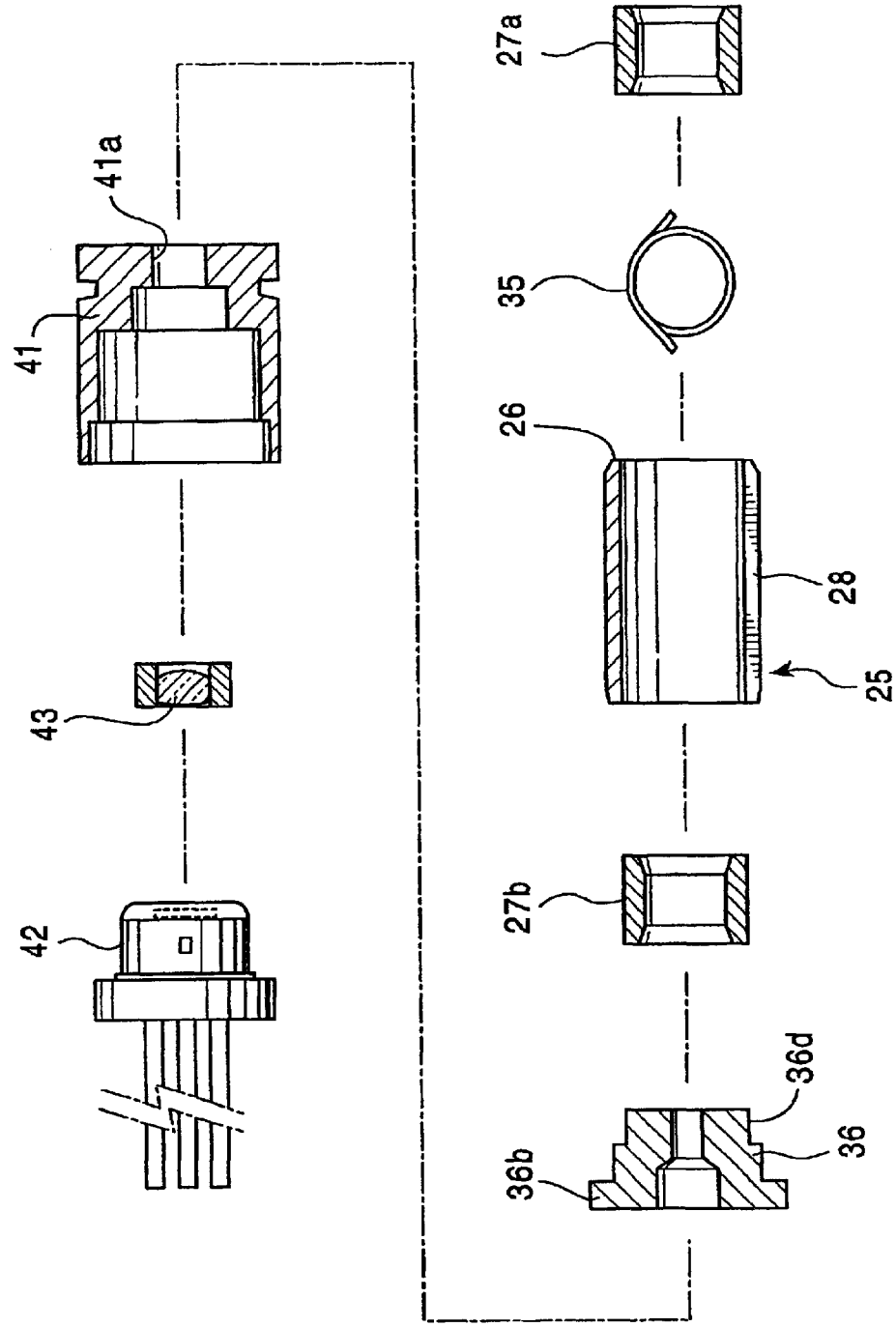
FIG. 4 is an enlarged exploded view showing a principal part of the optical fiber connector according to the first embodiment of the present invention.

As shown in FIGS. 2 and 4, a stopper 36 is made of approximately columnar stainless steel, a flange 36b is formed on one end thereof, and a circular light-guiding hole 36c having a stepped shape in cross section is opened from the upper surface of the other end of the stopper 36 to the central axis of the flange 36b. The upper surface 36a of the stopper 36 is accurately flattened, and an end of the ferrule 103 of the plug 101 elastically comes into contact with the upper surface 36b around the light-guiding hole 36c.

A step-like peripheral part 36d having a slightly reduced diameter is formed on the outer periphery of the stopper 36 near the upper surface 36a, and one end of the inner wall of the outer cylinder 26 abuts against the peripheral part 36d.

As shown in FIG. 2, an optical mechanism 40 is composed of a holder 41 made of stainless steel whose one end is formed in a cylindrical shape with a bottom, and an optical element 42, such as a semiconductor laser, and a lens 43 held in the holder 41 for constituting an optical member 44.

The lens 43 is disposed in the center of the holder 41, and the optical element 42 is disposed at an opening end of the other end of the holder 41. The bottom of the holder 41 is formed with an aperture 41a for emitting light from the optical element 42 through the lens 43.

Therefore, the optical element 42 and the lens 43 is positioned and fixed in the holder 41 so that the optical axes thereof coincide with each other.

Furthermore, an end surface of the holder 41 formed with the aperture 41a is fixed to the flange 36b of the stopper 36 so that the optical axis of the optical member 44 coincides with the optical axis of the optical fiber 100 inserted into the optical fiber connector 20.

A method for assembling the thus-constructed optical fiber connector 20 will now be described with reference to FIGS. 3 and 4.

First, one outer cylinder 26 and two inner cylinders 27a and 27b are prepared to assemble the cylinder 25, as shown in FIG. 4.

The outer cylinder 26 is formed by working a stainless steel plate having a uniform thickness in the shape of a cylinder so as to form the predetermined slit 28, whereby the outer cylinder 26 has an elastic urging force for returning to the original shape when an external force is applied thereto.

The inner cylinders 27a and 27b are burned by setting a temperature and time under predetermined conditions and are then cooled to room temperature, whereby a large number of micropores 30 is formed in the inner walls thereof.

When the inner cylinder 27a is inserted into the outer cylinder 26 to a mounting position of the stopper 36 described later, the outer cylinder 26 is slightly elastically deformed in the radial direction by the slit 28 so as to expand, so that the inner cylinder 27a is smoothly inserted.

Furthermore, the outer cylinder 26 and the inner cylinder 27a are attached and fixed by a spot-welding with a YAG laser or the like.

Then, the wire spring 35 is inserted into the cylinder 25 formed by the combined outer cylinder 26 and the inner cylinder 27a, and the ends 35b and a part of the ring part 35a are engaged with the cylinder 25.

Both ends 35b are cut into a wall of the recessed space 32 of the cylinder 25 so as to be like a wedge by the elastic urging force thereof, whereby the overall wire spring 35 is prevented from rotating in the cylinder 25, and the wire spring 35 is securely attached and fixed so that both ends 35b do not protrude inward from the inner wall of the inner cylinder 27a. The diameter of the ring part 35a of the wire spring 35 mounted as described above is formed to be slightly larger than the diameter of the ferrule 103. Before the insertion of the ferrule 103, the ring part 35a is located at a position inwardly deviated from the inner wall of the inner cylinder 27a. When inserting the ferrule 103, the ring part 35a can move in the axial direction (direction perpendicular to the optical axis).

The inner cylinder 27b is fitted to the outer cylinder 26 from the direction of insertion of the wire spring 35 and is similarly fixed by spot-welding with a YAG laser or the like, whereby the elastic deformation of the outer cylinder 26 after fitting the inner cylinder 27b thereto can be restricted. In this way, the inner cylinder 27a, the wire spring 35, and the inner cylinder 27b are aligned in the inner wall of the outer cylinder 26 along the axial direction, and the recessed space 32 accommodating therein the wire spring 35 is formed between the inner cylinder 27a and the inner cylinder 27b.

Even if the inner cylinders 27a and 27b differ somewhat in the diameter of the outer peripheral wall, they are disposed with reference to the axes thereof due to the elastic urging force of the outer cylinder 26. Therefore, the axial directions of the inner cylinders 27a and 27b coincide with each other.

As shown in FIG. 3, the receptacle casing 21 is assembled as follows. The clamper 24 is inserted into the outer peripheral part 23 from one opening end thereof, the outer peripheral edge of the base part 24a of the clamper 24 is fitted to the inner wall of the outer peripheral part 23, and the base part 24a of the clamper 24 and the outer peripheral part 23 are placed on the base 22 in such a manner that the circular hole 24d of the clamper and the circular hole 22a of the base 22 are superposed, and then predetermined sections are spot-welded by a YAG laser or the like.

To attach the cylinder 25 having the wire spring inserted therein and the stopper 36 to the receptacle casing 21, the peripheral part 36d of the stopper 36 is inserted into the outer cylinder 26.

When the peripheral part 36d is inserted into the inner wall of the outer cylinder 26 while being brought into sliding contact therewith, a fitting part formed on the end of the outer cylinder 26 is fitted to the peripheral part 36d. Then, predetermined sections are spot-welded, and the cylinder 25 and the stopper 36 are integrally attached and fixed.

The combined cylinder 25 and the stopper 36 are inserted into the circular hole 22a formed in the base 22 of the receptacle casing 21. The protruded edge 22b of the base 22 is abutted against the flange 36b of the stopper 36, and predetermined sections are fixed by spot-welding. In this way, the optical fiber connector 20 is completed.

Next, the optical mechanism 40, which is assembled in advance by accommodating the optical member 44 in the holder 40, is attached to the optical fiber connector 20 as follows.

A bottom part of the holder 41 of the optical mechanism 40 is held on the flange 36b of the stopper 36 of the optical fiber connector 20 by jigs (not shown) while being subjected to X-Y adjustment so that an optical axis of a laser beam emitted from the optical element 42 and an optical axis of the laser beam after passing through the lens coincide with an optical axis of the optical fiber serving as an aligning jig attached to the cylinder 25, and predetermined sections are fixed by spot-welding. In this case, since the outer periphery of the optical fiber 100 is pressed against, from one direction, to be affixed with respect to the inner walls of the inner cylinders 27a and 27b of the cylinder 25 due to the urging force of the wire spring 35, the optical axes are aligned using the affixing surfaces as reference planes. In this way, the optical communication module using the optical fiber connector 20 is completed.

A method for fitting the plug 101 of the optical fiber 100 to the optical fiber connector 20 will now be described.

First, an end of the plug 101 is located to face the opening end of the receptacle casing 21 of the optical fiber connector 20.

When the end of the plug 101 is inserted into the opening end of the housing receptacle casing 21, the pair of legs 24c of the clamper 24 abut against the end of the plug 101 to expand, the plug body 101a moves in the receptacle casing 21, the outer periphery of the ferrule-holding member 102 moves to the legs 24c, and the ferrule 103 moves in the inner wall of the inner cylinders 27a and 27b, respectively, while slide-contacting the inner walls of the inner cylinders 27a and 27b, an end surface of the ferrule 103 is elastically brought into contact with the upper surface 36a of the stopper 36 by the coil spring 104, and the pair of elastic pawls 24b of the clamper 24 are snap-fitted into the elastic lock-receiving part 102b.

Figure 11A:
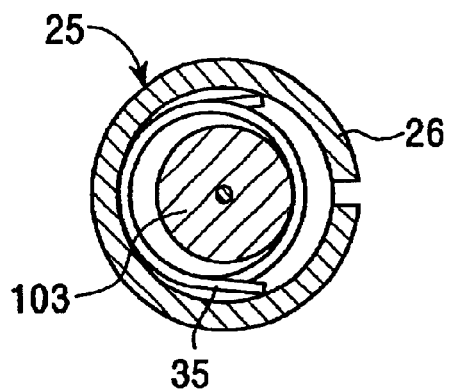
FIG. 11A is an enlarged sectional view showing the state near the elastic member when the plug is fitted to the optical fiber connector according to the first embodiment of the present invention.

As shown in FIG. 11A, by the insertion of the ferrule 103 of the plug 101 into the cylinder 25, the ring part 35a of the wire spring 35 moves in the radial direction, presses the outer periphery of the ferrule 103 in the direction perpendicular to the optical axis of the optical fiber 100 by the elastic urging force thereof, and brings the outer periphery of the ferrule 103 into abutment with the predetermined sections (the reference planes) on the inner wall of the cylinder 25 (inner cylinders 27a and 27b).

Since the diameter of the inner wall of the cylinder 25 near the opening end of the inner cylinder 27a, and the inner diameter of the inner cylinder 27b near the ferrule-abutting surface 36a are accurately worked, the outer periphery of the ferrule 103 abutting against the inner wall of the cylinder 25 is accurately positioned in the radial direction.

Figure 10:
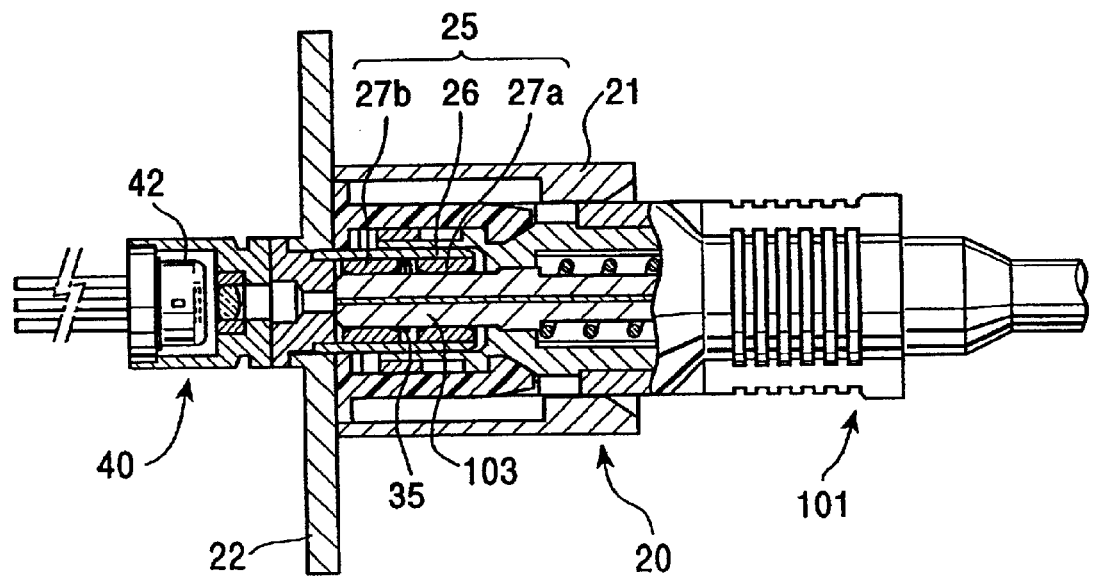
FIG. 10 is a sectional view showing the state where a plug of an optical fiber is fitted to the optical fiber connector according to the first embodiment of the present invention.

In this way, the optical fiber 100 is attached to the optical fiber connector 20 (see FIG. 10). Therefore, divergent light emitted from the optical element 42 is converted into focused light by the lens 43, and light emitted from the lens 43 is accurately applied to the end surface of the optical fiber 100 located in the ferrule 103 of the plug 101.

The wire spring 35 may have any shape as long as it is an elastic member for elastically pressing the ferrule 103 of the plug 101 in the radial direction.

In addition, the elastic member may be a molded article having a flexible part. Preferably, the molded article may be a wire spring or a leaf spring made of metal from the viewpoints of a service temperature and durability.

Figure 8B:
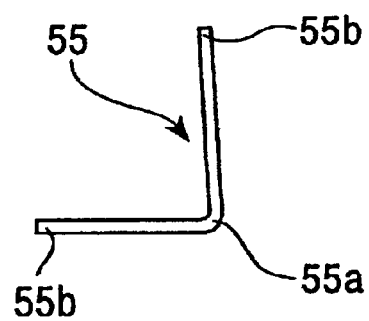
FIGS. 8B and 8C are plan views, each showing a modification of the elastic member.

For example, as shown in FIG. 8B, a wiring spring 55, which is a first modification of the elastic member, is formed of a wire rod bent in a V-shape, and has a bent part 55a and ends 55b.

Figure 11B:
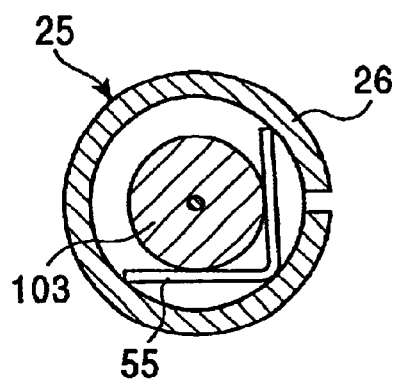
FIGS. 11B and 11C are enlarged sectional views each showing the state near an elastic member when a plug is fitted to an optical fiber connector having the elastic member accommodated therein.

As shown in FIG. 11B, the bent part 55a and the ends 55b of the wire spring 55 engage with the recessed space 32 of the cylinder 25.

Portions of the wire spring 55 between the ends 55b abut against the outer periphery of the ferrule 103 of the inserted plug 101 so as to expand, and elastically bring the outer periphery of the ferrule 103 into contact with the inner walls of the inner cylinders 27a and 27b with the elastic urging force produced by the expansion.

In addition, the wire spring 55 is locked within the recess 32 of the cylinder 25 due to its own elastic urging force to prevent the rotation thereof.

Figure 8C:
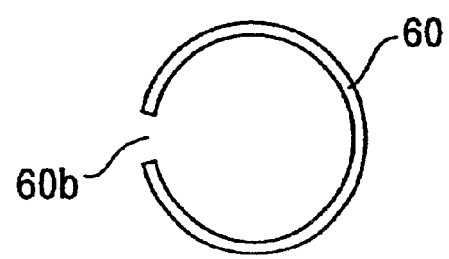

In addition, as shown in FIG. 8C, a wire spring 60, which is a second modification of the elastic member, is formed of a C-shaped wire rod having a cutout 60b.

Figure 9:
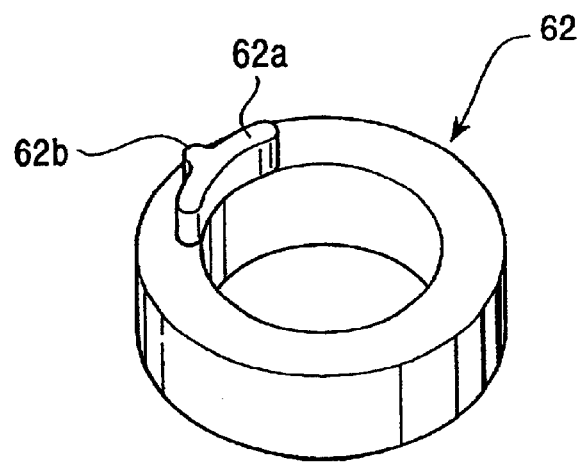
FIG. 9 is a perspective view showing a modification of the inner cylinder of the optical fiber connector according to the first embodiment of the present invention.

As shown in FIG. 9, an inner cylinder 62 corresponds to the wire spring 60, and has a protrusion 62a formed on the peripheral part of one end thereof, and the protrusion 62a is formed with a projection 62b slightly projecting outward in the radial direction of the inner cylinder 62.

The wire spring 60 is disposed on the peripheral end surface of the inner cylinder 62, the cutout 60b is located at the projection 62b of the protrusion 62a, and both ends of the wire spring 60 elastically sandwich the projection 62b.

Figure 11C:
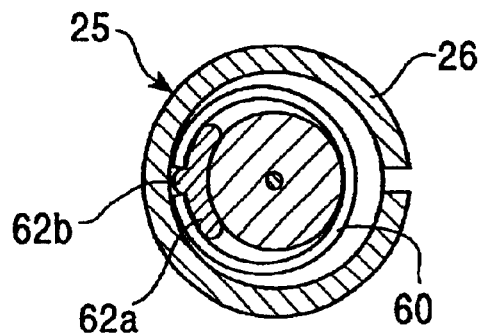

As shown in FIG. 11C, the inner cylinder 62 is used instead of the inner cylinder 27b, and the plug 101 is inserted into the optical fiber connector 20 having the wire spring 60 inserted in the inner cylinder 62. The diameter of the wire spring 60 is expanded by the outer periphery of the ferrule 103, and the cutout 60b of the wire spring 60 is also expanded. The wire spring 60 is deformed by the elastic urging force, whereby the wire spring 60 elastically presses the outer periphery of the ferrule 103 so as to bring the outer periphery of the ferrule 103 into abutment with the inner wall of the inner cylinder 62, and the protrusion 62a.

Since the wire spring 60 is attached to the projection 62b of the inner cylinder 62, rotation thereof is prevented.

If dust adheres to the inside of the cylinder 25 when the plug 101 is inserted into the optical fiber connector 20, or if the dust enters into the cylinder 25 together with the insertion of the plug 101, the dust is collected in micropores 30 (see FIG. 7) formed in the sintered stainless steel constituting the inner wall of the cylinder 25.

The inner wall of the inner cylinders 27a, 27b, and 62 of the cylinder 25 may be formed of at least porous sintered stainless steel. By forming a large number of micropores 30 in the inner cylinder 27 disposed on the insertion side of the plug 101, dust is collected in the micropores 30 on the initial stage of the insertion of the plug 101.

In addition, by forming the cylinder 25 of a porous member, air in a space between the cylinder 25 and the ferrule 103 passes through the micropores 30 when the plug 101 is inserted into the optical fiber connector 20, and air compression during the insertion is restricted, whereby the plug 101 is smoothly inserted into the optical fiber connector 20.

The fine dust which enters is caught by the micropores when inserting the ferrule 103 into the inner cylinders 27a and 27b of the cylinder 25, whereby the inner walls of the inner cylinders 27a and 27b and the surface of the ferrule 103 can be prevented from being scratched.

As a result, even if the cylinder 25 and the ferrule 103 are repeatedly inserted and extracted during the attachment and detachment of the plug 101 with and from the optical fiber connector 20, a stable optical coupling condition can be maintained.

In addition, the use of a readily workable sintered metal provides an inexpensive optical fiber connector 20.

An optical fiber connector 70 according to a second embodiment of the present invention will now be described with reference to FIG. 12.

The optical fiber connector 70 differs from the above-described optical fiber connector 20 in the construction of the casing, but other component parts are the same as the above-described optical fiber connector 20. Therefore, the component parts are indicated by the same reference numerals, and detailed description thereof will be omitted.

Figure 12:
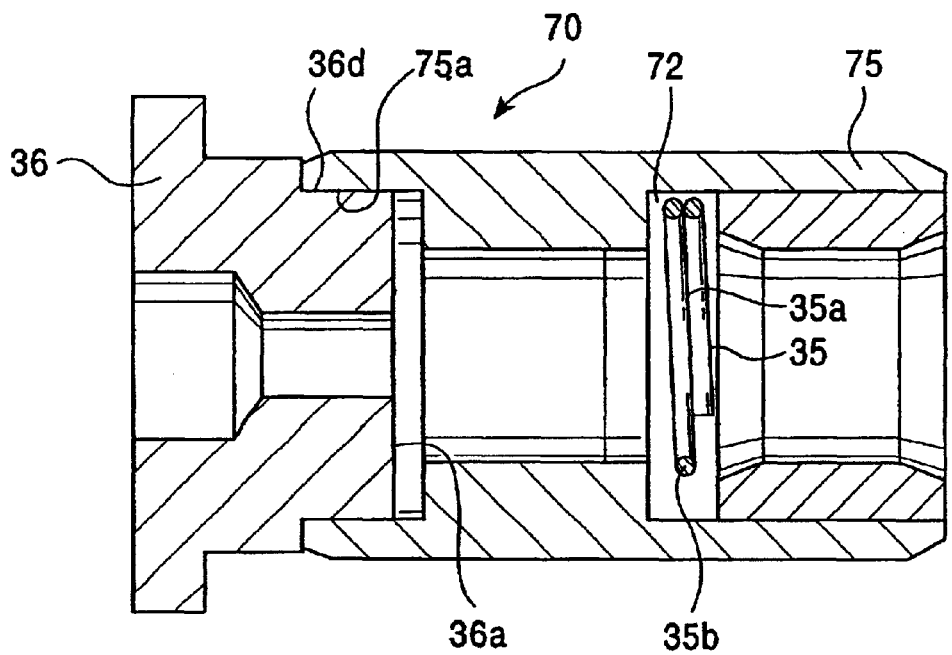
FIG. 12 is an enlarged sectional view showing a principal part of an optical fiber connector according to a second embodiment of the present invention.

As shown in FIG. 12, a cylinder 75 is formed of one cylindrical porous sintered stainless steel, and a recess 72 is formed in approximately the center of the inner wall by a secondary cutting operation.

One end of the inner wall of the cylinder 75 is cut out to form a stepped portion 75a so as to reduce the thickness of the cylinder 75. An upper surface 36a and a peripheral part 36d of a stopper 36 are fitted to the stepped portion 75a.

Ends 35b of the above-described wire spring 35 are disposed in the recess 72 in the state of being elastically urged in a manner similar to the first embodiment, and a ring part 35a protrudes to a space of the inner wall of the cylinder 75.

When a ferrule 103 provided at an end of an optical fiber 100 is inserted into the cylinder 75 in order to fit a plug 101 to the thus-constructed optical fiber connector 70, the ferrule 103 moves in the cylinder 75 with the outer periphery thereof slide-contacting the ring part 35a of the wire spring 35, the ring part 35a moves in the radial direction, and the end of the ferrule 103 is elastically brought into contact with the upper surface 36a of the stopper 36 by the action of the coil spring 104. In addition, the outer periphery of the ferrule 103 is elastically pressed by the elastic urging force of the wire spring in the direction perpendicular to the optical axis of the optical fiber 100, and the outer periphery of the ferrule 103 is brought into abutment with reference planes on the inner wall of the cylinder 75 to be securely held.

Even if the above-described wire spring 55 (see FIG. 8B) is used instead of the wire spring 35, the plug 101 can be fitted to the optical fiber connector 70.

An optical fiber connector 80 according to a third embodiment of the present invention will now be described with reference to FIG. 13.

The optical fiber connector 80 differs from the above-described optical fiber connectors 20 and 70 in the construction of the casing, but other component parts are the same as the above-described optical fiber connectors 20 and 70. Therefore, the component parts are indicated by the same reference numerals, and detailed description thereof will be omitted.

Figure 13:
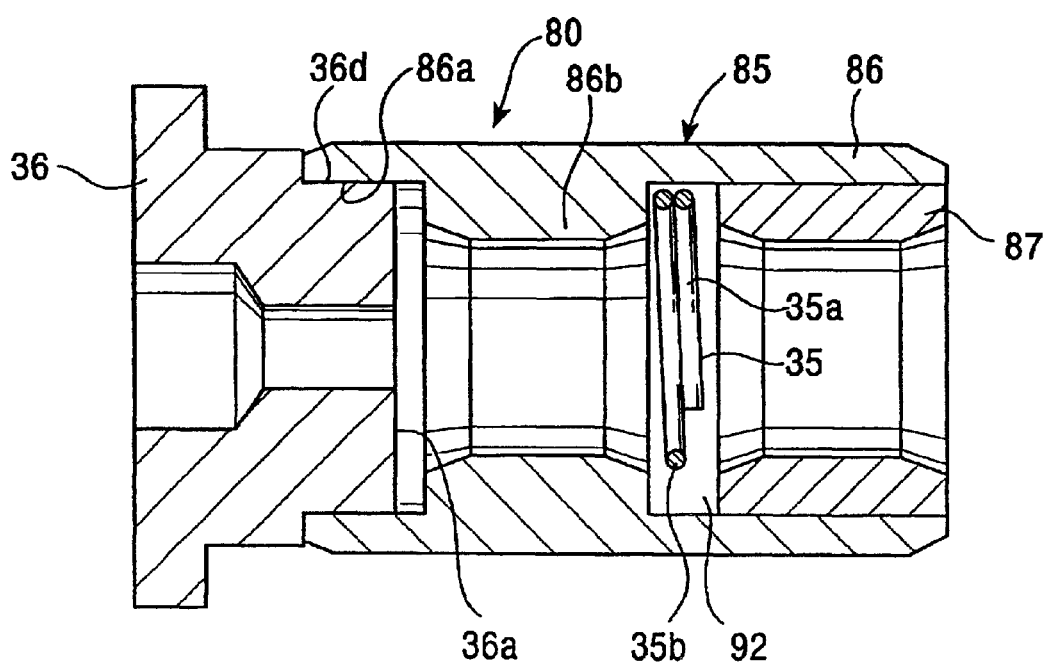
FIG. 13 is an enlarged sectional view showing a principal part of an optical fiber connector according to a third embodiment of the present invention.
Figure 14:
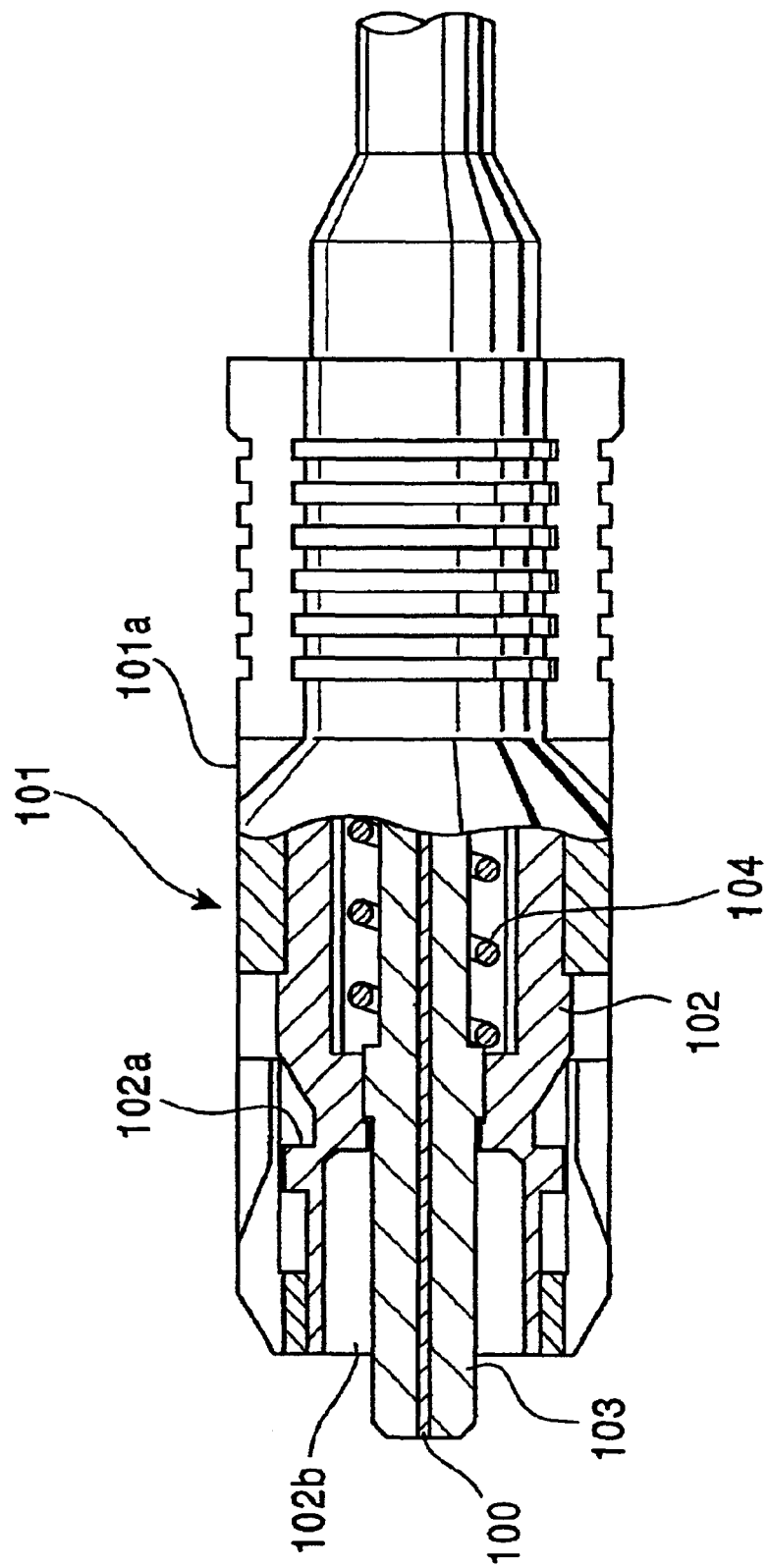
FIG. 14 is a sectional view showing a conventional plug for holding an end of an optical fiber.
Figure 15:
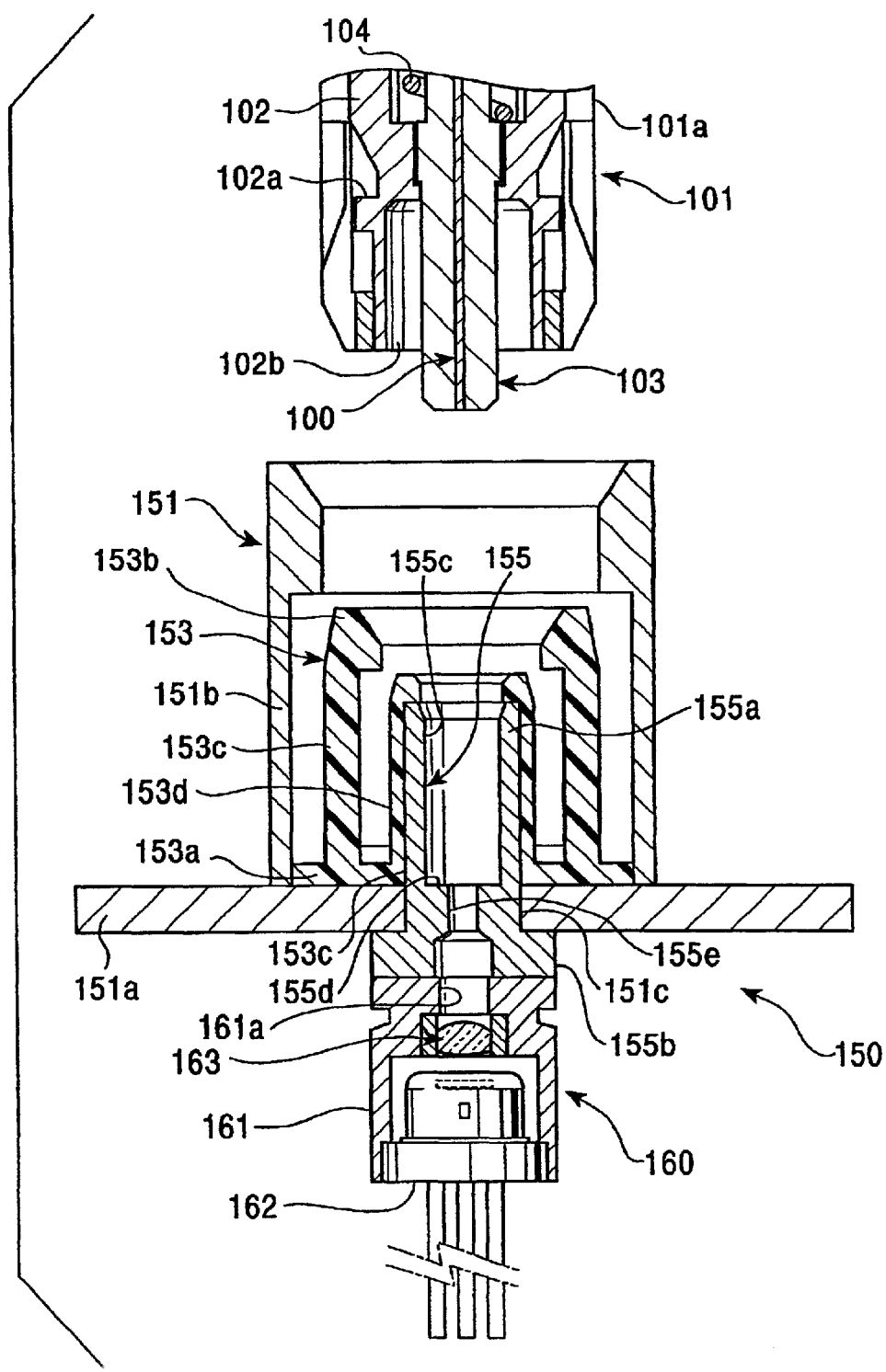
FIG. 15 is a sectional view showing a conventional optical fiber and the conventional plug of the optical fiber.

As shown in FIG. 13, a cylinder 85 is composed of an outer cylinder 86 and an inner cylinder 87.

The outer cylinder 86 is made of a cylindrical stainless steel, and the thickness of the inner wall is increased from approximately the center thereof toward one end to form a thick-walled part 86b. A stepped portion 86a is formed by the thick-walled part 86b at one end of the outer cylinder 86. An upper surface 36a and a peripheral part 36d are fitted to the stepped portion 86a.

The inner cylinder 87 is made of a cylindrical porous sintered stainless steel.

The inner cylinder 87 is disposed in the inner wall of the other end of the outer cylinder 86, and the inner diameter of the cylinder 85 is formed in the same size along the axial direction by the inner wall of the inner cylinder 87 and the thick-walled part 86b of the outer cylinder 86. A recessed space 92 is provided between the inner cylinder 87 and the outer cylinder 86.

The above-described wire spring 35 is disposed in the cylinder 85, the ring part 35a of the wire spring 35 is disposed in a space of the cylinder 85, and both ends 35b of the wire spring 35 are elastically urged and locked in the recessed space 92.

A method for fitting the plug 101 to the thus-constructed optical fiber connector 80 is the same as the above first and second embodiments, and the wire spring 55 (see FIG. 8B) may be used instead of the wire spring 35.

In addition, the wire spring 60 (see FIG. 8C) may be disposed in the recessed space 92 of the cylinder 85 by forming an end of the thick-walled portion 86b of the outer cylinder 86 in the shape of the protrusion 62a of the above inner cylinder 62.

The optical fiber connector 20 according to the first embodiment offers the following advantages.

(1) Even if a gap is formed between the inner walls of the inner cylinders 27a and 27b attached and fixed to the outer cylinder 26 and the ferrule 103 of the plug 101 when the ferrule 103 is inserted in the inner walls of the inner cylinders 27a and 27b, the wire spring 35 disposed in the recessed space 32 elastically presses the outer periphery of the ferrule 103 in the radial direction by the elastic urging force thereof, and brings the outer periphery into abutment with the predetermined sections on the inner walls of the inner cylinders 27a and 27b. Therefore, the plug 101 can be fitted to the optical fiber connector 20 so that the optical axis of the optical fiber 100 in the ferrule 103 coincides with the optical axes of the optical element 42 and the lens 43, and even a small-diameter ferrule 103 can be securely held.

(2) The fixed inner cylinders 27a and 27b have the reference planes for positioning the outer periphery of the ferrule and the function of accommodating the outer periphery of the ferrule, and the ferrule 103 is held while being sandwiched by the reference planes of the inner cylinders 27a and 27b and the elastic member. Therefore, the ferrule 103 and the optical fiber 100 contained in the ferrule 103 are constantly pressed in the radial direction, whereby variations in optical coupling effected by the optical fiber 100 in the optical fiber connector 20 can be restricted.

(3) Since the inner cylinder is divided into two inner cylinders 27a and 27b, the length thereof in the axial direction is reduced to be shorter than the length of the conventional sleeve 155. Therefore, the inner walls of the inner cylinders 27a and 27b can be accurately worked without spending time, so that the cost can be reduced.

(4) Since the slit 28 is formed in the outer cylinder 26, the inner cylinders 27a and 27b can be easily inserted into the outer cylinder 26 due to elastic deformation of the outer cylinder 26. When the ferrule 103 is inserted in the cylinder 25, the deformation of the cylinder 25 in the radial direction due to the insertion and extraction of the ferrule 103 is prevented because the outer cylinder 26 and the inner cylinders 27a and 27b are fixed by spot-welding.

(5) When the inner cylinders 27a and 27b are inserted in the outer cylinder 26 which is elastically deformed, even if the inner cylinders 27a and 27b differ somewhat in the size of the outer peripheral wall, the inner cylinders 27a and 27b are disposed so that the axes thereof coincide with each other due to the inward elastic force of the outer cylinder 26. Therefore, the cylinder 25 can be assembled easily and accurately.

(6) Both ends 35b of the wire spring 35 are accommodated in the recessed space 32 of the cylinder 25, and the ring part 35a of the wire spring 35 is protruded to a space, whereby the ring part 35a moves in the radial direction when the ferrule 103 is inserted, and the outer periphery of the ferrule 103 can be elastically pressed without being scratched.

(7) Both ends 35b of the wire spring 35 are locked in the recessed space 32 of the cylinder by the elastic urging force of the wire spring 35, whereby rotation of the wire spring 35 can be prevented from rotation in the circumference direction in the cylinder 25. In addition, the need to weld and fix the wire spring 35 is eliminated, and a spring portion for producing a force for holding the ferrule 103 is not limited, even a small-diameter ferrule 103 can be securely held.

(8) The wire spring 55 is formed by bending a piece of a wire rod, and the outer periphery of the ferrule 103 inserted into the optical fiber connector 20 can be securely held with a simple structure.

(9) In the cylinder 25 having the inner cylinder 62 accommodated therein, the wire spring 60 engages with the projection 62b of the protrusion 62a of the inner cylinder 62, so that the cylinder 25 is not easily disengaged from the inner cylinder 62 even if an unnecessary external force is applied thereto.

(10) All the wire springs 35, 55, and 60 are accommodated in the cylinder 25, whereby the ferrule 103 can be securely held by a small component without taking a space, and the size of the optical fiber connector can be reduced.

(11) In the optical communication module, by assembling the optical mechanism 40 in advance, the optical fiber connector 20 and the optical mechanism 40 can be easily fixed by welding with a YAG laser.

In addition, a light-receiving element, such as a photodiode, can be incorporated instead of the optical element 42 of the optical mechanism 40 so as to form a light-receiving communication module.

The optical fiber connector 70 according to the second embodiment offers the following advantages. Since the cylinder 75 is made of one sintered stainless steel, spot welding with a YAG laser is not required for the cylinder 75, and only the wire spring 35 may be inserted. Therefore, the number of assembly steps can be decreased.

The optical fiber connector 80 according to the third embodiment offers the following advantages.

Only the inner cylinder 87 may be formed of a porous sintered stainless steel, and dust can be collected in the micropores 30 in the initial state of insertion of the ferrule 103, and the outer periphery of the ferrule 103 is not scratched by dust.

In addition, the wire spring 35 is sandwiched only by inserting the inner cylinder 87 into the outer cylinder 86 from one direction. Therefore, if the wire spring 35 is inserted before inserting the inner cylinder 87, the optical fiber connector 80 can be assembled more easily.

While the present invention has been described with reference to what are presently considered to be the preferred embodiments, it is to be understood that the invention is not limited to the disclosed embodiments. On the contrary, the invention is intended to cover various modifications and equivalent arrangements included within the sprit and scope of the appended claims. The scope of the following claims is to be accorded the broadest interpretation so as to encompass all such modifications and equivalent structures and functions.

What is claimed is:

1. An optical fiber connector to connect an inserted optical fiber, the optical fiber having an end and an optical axis, a portion of the optical fiber contained within a fiber holding part provided at the end of the optical fiber, the fiber holding part having an outer periphery, the optical fiber connector comprising:
    a receptacle casing having an end;
    a cylinder provided in the receptacle casing and having an inner wall; and
    an elastic member accommodated in the inner wall of the cylinder and elastically pressing the outer periphery of the fiber holding part in a direction perpendicular to the optical axis of the optical fiber;
    wherein the inner wall of the cylinder abuts the outer periphery of the fiber holding part, and the end of the receptacle casing is aligned with the end of the optical fiber.

2. An optical fiber connector according to claim 1, the inner wall of the cylinder comprising a recess for accommodating and positioning the elastic member, a portion of the elastic member protruding into the recess of the cylinder.

3. An optical fiber connector according to claim 2, wherein the portion of the elastic member locks in the recess of the cylinder, whereby rotation of the cylinder in a circumferential direction is prevented.

4. An optical fiber connector according to claim 3, the elastic member comprising a bent spring wire rod, the spring wire rod being locked by an elastic urging force thereof in the recess of the cylinder.

5. An optical fiber connector according to claim 4, wherein the spring wire rod is shaped like a ring and has two ends that are elastically pressed against the recess of the cylinder.

6. An optical fiber connector according to claim 4, wherein the spring wire rod has an L-shaped cross-section and has two ends that are elastically pressed against the recess of the cylinder.

7. An optical fiber connector according to claim 4, the cylinder having a protrusion, the protrusion having a projection formed on a peripheral part on one end thereof and projecting outward in a radial direction of the inner cylinder, wherein the spring wire rod has a C-shaped cross-section having a cutout into which the projection is elastically sandwiched.

8. An optical fiber connector according to claim 1, wherein the cylinder comprises an outer cylinder and a plurality of inner cylinders, the plurality of the inner cylinders have inner walls and are accommodated in the outer cylinder in a direction of the optical axis of the optical fiber at predetermined intervals, the intervals between the inner cylinders form a recess for accommodating and positioning the elastic member, a portion of the elastic member protrudes into the recess, and the inner walls of the inner cylinders forms the inner wall of the cylinder.

9. An optical fiber connector according to claim 8, wherein the portion of the elastic member locks in the recess, whereby rotation of the cylinder in a circumferential direction is prevented.

10. An optical fiber connector according to claim 9, the elastic member comprising a bent spring wire rod, the spring wire rod being locked by an elastic urging force thereof in the recess.

11. An optical fiber connector according to claim 10, wherein the spring wire rod is shaped like a ring and has two ends that are elastically pressed against the recess.

12. An optical fiber connector according to claim 10, wherein the spring wire rod has an L-shaped cross-section and has two ends that are elastically pressed against the recess.

13. An optical fiber connector according to claim 10, one of the inner cylinders having a protrusion, the protrusion having a projection formed on a peripheral part on one end thereof and projecting outward in a radial direction of the one of the inner cylinders, wherein the spring wire rod has a C-shaped cross-section having a cutout into which the projection is elastically sandwiched.

14. An optical fiber connector according to claim 1, wherein:
    the cylinder comprises an outer cylinder and a single inner cylinder,
    the outer cylinder has a thick walled portion with an inner wall and a thin walled portion,
    the inner cylinder has an inner wall, is accommodated in the thin walled portion of the outer cylinder, and has an end facing the thick walled portion of the outer cylinder,
    a space between an end of the inner cylinder and an end of the thick walled portion of the outer cylinder forms a recess for accommodating and positioning the elastic member,
    a portion of the elastic member protrudes into the recess, and
    the inner wall of the inner cylinder in conjunction with the inner wall of the outer cylinder form the inner wall of the cylinder.

15. An optical fiber connector according to claim 14, wherein the thick walled portion of the outer cylinder is constant in thickness.

16. An optical fiber connector according to claim 14, wherein the thick walled portion of the outer cylinder is tapered such that a thickness of the thick walled portion decreases from the end of the thick walled portion towards a middle of the thick walled portion.

17. An optical fiber connector according to claim 1, wherein the cylinder is composed of a material having a plurality of micropores to collect dust therein and pass air therethrough when the optical fiber is inserted.

18. An optical communication module, comprising the optical fiber connector of claim 1, and an optical member to one of emit and receive light fixed to an outside of the receptacle casing, the optical member disposed such that the optical axis of the optical fiber coincides with the optical axis of the optical member.

19. A method for decreasing coupling losses between an optical fiber and an optical member that one of emits and receives light, the optical fiber having an optical axis, contained within a fiber holding part having an outer periphery, and inserted in an optical fiber connector, the optical member disposed on an outside of the optical fiber connector, the method comprising:

adjusting a position of the outer periphery of the fiber holding part by elastically pressing the outer periphery of the fiber holding part in a direction perpendicular to the optical axis of the optical fiber; and aligning the optical fiber with the optical member.

20. The method of claim 19, further comprising adjusting an effective inner dimension of the optical fiber connector to contact the inserted optical fiber.

21. The method of claim 20, the adjusting of the effective inner dimension of the optical fiber connector comprising decreasing the inner dimension of the optical fiber connector.

22. The method of claim 21, the decreasing the inner dimension of the optical fiber connector further comprising elastically deforming the effective inner dimension of the optical fiber connector.

23. The method of claim 20, the adjusting of the effective inner dimension of the optical fiber connector further comprising elastically deforming the effective inner dimension of the optical fiber connector.

24. The method of claim 20, the adjusting of the effective inner dimension of the optical fiber connector comprising allowing an elastic member disposed within the optical fiber connector to adapt to the outer periphery of the fiber holding part.

25. The method of claim 24, the adapting of the elastic member to the outer periphery of the fiber holding part comprising the elastic member substantially constricting around the outer periphery of the fiber holding part.

26. The method of claim 24, further comprising locking a portion of the elastic member with the optical fiber connector and preventing rotation of a portion of the optical fiber connector in a circumferential direction.

27. The method of claim 19, further comprising preventing rotation of a portion of the optical fiber connector in a circumferential direction.

28. A method for increasing allowable variations in inner dimensions of an optical fiber connector that couples an optical fiber and an optical member that one of emits and receives light, the optical fiber having an optical axis, inserted into the optical fiber connector, and contained within a fiber holding part having an outer periphery, the optical member disposed on an outside of an optical fiber connector, the method comprising:

adjusting a position of the outer periphery of the fiber holding part in a direction perpendicular to the optical axis of the optical fiber using an elastic member accommodated within the optical fiber connector; and aligning the optical fiber with the optical member.

* * * * *